United States Patent Office 3,003,310
Patented Oct. 10, 1961

3,003,310
COMBUSTION PROCESS EMPLOYING IRRADIATED SOLID POLYMERIC FUELS CONTAINING OXIDIZING AGENTS
Gaetano F. D'Alelio, South Bend, Ind., assignor to Bar Dal, Inc., a corporation of Delaware
No Drawing. Filed Sept. 26, 1958, Ser. No. 763,485
20 Claims. (Cl. 60—35.4)

This invention relates to a combustion process, using as the fuel component solid, irradiated, polymeric hydrocarbons or oxygenated polymeric hydrocarbons containing solid or liquid oxidizing agents therein. More specifically, it relates to such combustion process in which the fuel is fed as a continuous wire, ribbon, or rod into the combustion zone.

The use of solid fuel in a combustion gun or zone has the advantage that it dispenses with the need for a heavy tank to contain gaseous fuel under high pressure, and also dispenses with the need for pumping devices to deliver liquid or powdered fuel for such purposes. The disadvantage against using solid fuel in rod or ribbon form is the fact that most materials from which such rods could be shaped, decompose upon heating to liquid products which drip or blow away upon melting or softening of the rod. This results in wasting some of the B.t.u. content of the fuel. Moreover, the solid fuel needs to be contacted with a combustion-supporting gas in order to continue the combustion.

In accordance with the present invention, it has been found that a continuous wire, or ribbon, or rods of convenient length, of irradiated polymeric hydrocarbons, or oxygenated polymeric hydrocarbons containing an amount of oxidizing agent therein suffiicent to sustain combustion by itself, or to supplement the action of a separate combustion-supporting gas of much smaller amount than would otherwise be required can be used. The gel type structure of the polymer, produced by irradiation of the same, results in a type of combustion which does not cause the polymer to melt to a liquid before burning and thereby avoids losses of heat value which might otherwise occur, resulting in a highly efficient conversion of the B.t.u. content of the fuel. This process can be used in devices of the type disclosed in copending application Serial No. 730,714, now abandoned, with or without contact with the streams, etc., of combustion-supporting gas shown therein, and can also be used as flares and other lighting devices. In this latter connection, the self-sustaining features are of particular value where the flare or heating process is to be applied in a medium such as water or rarefied atmosphere, which cannot aid in supporting the combustion.

The polymers used in the practice of this invention can be any type of polymeric hydrocarbon or oxygenated hydrocarbon. However, polymeric olefins and polymeric vinyl aryl hydrocarbons are advantageously used because of their high B.t.u. value. Suitable polymeric olefins include polyethylene, polypropylene, polybutene-1, polyisobutylene, polypentene-1, polyoctene-1, etc. Suitable polymeric vinyl aryl hydrocarbons include polymers of styrene, vinyl toluene, alpha-methyl styrene, alpha ethyl styrene, vinyl naphthalene, vinyl diphenyl, etc., and any of the foregoing substituted on the aryl nucleus by various alkyl or aryl hydrocarbon groups, such as, for example, ethyl styrene, diethyl styrene, propyl styrene, butyl styrene, amyl styrene, ethyl vinyl naphthalene, methyl vinyl naphthalene, butyl vinyl naphthalene, diethyl vinyl naphthalene, amyl vinyl naphthalene, ethyl vinyl diphenyl, diethyl vinyl diphenyl, butyl vinyl diphenyl, diamyl vinyl diphenyl, etc. Suitable oxygenated polymeric hydrocarbons include any of the foregoing polymers which have been oxygenated.

While derivatives of these polymers can be used when monomer units contain various groups, such as hydroxy, halo, carboxyl, carboxylate, etc., there is no particular added advantage in using such materials. Since they are generally more expensive, sometimes have lower B.t.u. content, and in some cases give off toxic, corrosive, or otherwise injurious by-products from the combustion, the hydrocarbon polymers are generally preferred.

It is also permissible and often advantageous to have various polyunsaturated modifiers present to assist in the crosslinking produced by the irradiation. Such modifiers include divinyl aryl compounds such as, divinyl benzene, divinyl naphthalene, divinyl diphenyl, etc. Other polyunsaturated modifiers that can be used for this purpose include polyunsaturated polyesters, polyethers, mixed ether-esters, substituted derivatives of polyalkenyl aryl hydrocarbons, etc. Examples of these are listed hereinafter.

The polymer-oxidizing agent mixture is advantageously prepared and shaped in the form in which it is ultimately to be used, such as wire, ribbon, rod form, etc., and then irradiated either by running the wire, ribbon, etc., through a field exposed to irradiation, or by exposing the whole spool, or other support upon which the wire or ribbon is contained.

The irradiation often causes an increase in the stiffness of the polymer mixture. In some cases, where high dosages of irradiation are used, a flexible wire or ribbon is converted to a very stiff ribbon or wire. Also, in cases where very high concentrations of oxidizing agent are used, the mixture itself is much less flexible than the polymeric material. In such cases, the stiff material can be cut into lengths convenient for feeding into the combustion gun or torch. It is generally advantageous, however, to have the irradiated polymer composition in a flexible form so that it can be fed from a spool or other device on which it may be wound, thereby conserving storage space and facilitating the feeding operation. The use of polyunsaturated modifiers enhances the retention of flexibility and permits the desired degree of crosslinking to be obtained with a lower degree of stiffness, as well as with lower irradiation dosages, than is otherwise possible.

The ideal amount of irradiation, for the purposes of this invention, is that which is sufficient to produce the type of crosslinked polymer that will not melt or soften to flowable form upon heating and still is not sufficient to impart rigidity to the polymer. Obviously, this amount of irradiation will vary with the type of polymer, the molecular weight of the same, and the (oxidizing agent and) modifiers and amount thereof that are present. However, the use of stiff or rigid polymers of the type indicated herein is considered as within the scope of this invention. With high molecular weight polymers, such as high molecular weight polyethylene, and particularly when polyunsaturated modifiers are present, irradiation doses often as low as 2 megareps, or even 1 megarep, will produce products which will not melt or drip upon combustion, and, therefore, are satisfactory for the practice of this invention. Generally, however, it is desirable to use a minimum of 5 megareps or more in the preparation of the irradiated polymer. Irradiation dosages in excess of those required to give the nondripping properties in the polymeric material give no added advantage for the purpose of this invention and, as pointed out above, may result in stiffness or rigidity. It is also sometimes advantageous to use mixtures of resins of the type indicated above, particularly when it is desired to impart flexibility to an otherwise stiff resin. For example, polyethylene mixed with polystyrene improves the flexibility of the latter. Depending on the particular polymeric mixture being treated, it is generally of no added advantage to use irradiation dosages of over 100 megareps.

In preparing the mixtures of polymers and oxidizing agents, together with any polyunsaturated modifier, or other modifiers to be incorporated, the mixture can be effected by any convenient means, such as, for example, mechanically as on mixing mills, on a Banbury mixer, or any single or double worm extruder. Such compounded mixtures can then be extruded or otherwise shaped into the desired form and then irradiated.

Methods of making polymers used in the practice of this invention are well-known. Copolymers, as well as polymers can be used, provided the copolymers do not give undesirable properties in the ultimate use and also do not lower the B.t.u. value of the fuel below the desired limit. The molecular weight of the polymer can be as low as 3,000 and even lower. However, it is generally desirable that polymers of at least about 6,000 molecular weight, or greater, be used. Obviously, there is no upper limit to the molecular weight of the polymers that can be used in the practice of this invention, so long as the desired properties are present.

In addition to the devices referred to above, as disclosed in copending application Serial No. 730,714, filed April 24, 1958, the process of this invention can be practiced in various other types of devices which will advance the ribbon, wire, rod, etc., linearly into the ignited zone, or advance the ignited zone along the length of the elongated fuel. Probably the simplest technique is to use a long rod of the polymer-oxidizing agent composition having the oxidizing agent in such proportion that the combustion is so controlled that it proceeds gradually along the length of the fuel. This is particularly advantageous with respect to flares, since this requires no mechanism for advancing the fuel through the ignited zone. Devices similar to those in the said copending application, minus the stream-directing devices, are also suitable. For example, a ribbon, etc., of the polymeric material can be advanced through an opening in a protective shield, which will separate and insulate the advancing ribbon from the ignited zone, and be actuated through the opening by advancing between rollers rotated, for example, by a spring-actuated clock-type mechanism. The rate of advancement can be adjusted by adjusting the clock type mechanism, selecting rolls of different diameters, etc.

As indicated above, the oxidizing agents should be added before irradiation. These are desirably in fine particle size so as to permit substantially uniform distribution throughout the mass. The concentration of oxidizing agent is determined by the type of use to which the ultimate product is to be put; that is, whether it is to be of the self-sustaining type, or is to be used in conjunction with a supplementary, separate combustion-supporting fluid. The amount is also determined by the desired degree of efficiency to be attained in the combustion. The upper limit in the amount of oxidizing agent is determined by the concentration that can safely be used under the conditions of ultimate use, or by that excess over the stoichiometric amount required for complete combustion of the fuel, whichever limit is reached first. Obviously, the safety limit will vary according to the tye of oxidizing agent used, the type of fuel base polymer material used, together with its heat capacity and heat transmission properties, the temperature which will exist in the preparation and use of the fuel, etc.

Since the fuel composition can be used in various manners, varying from that in which a substantial amount of the combustion is supported by the separate oxidizing agent, to that in which the combustion is self-sustained by the oxidizing agent contained in the fuel, the minimum amount of such oxidizing agent contained in the fuel will depend on the manner in which the fuel is to be used. When the combustion is to be maintained partly by an oxidizing agent in the fuel and partly by the oxidizing agent supplied independently, then obviously the supplemental effect of one agent toward the other will depend on the particular material being used as the oxidizing agent in the fuel and on the particular oxidizing fuel being fed independently.

Moreover, in each case the relative amounts cannot be determined on a weight basis, but must be determined on the amount of oxygen or other "oxidizing element" available in the particular oxidizing agent used to support combustion. This depends on the oxidizing content of the oxidizing agent and the percent of that agent that is liberated for oxidizing purposes upon decomposition thereof. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of the B.t.u. content, then it may be desirable to use a smaller amount of oxidizing agent. Generally, it is advantageous to use from 1 percent to 95 percent, preferably about 5 to 80 percent, by weight, of oxidizing agent based on the combined weight of oxidizing agent, base polymer material, and any crosslinking modifier that is used.

The combustion of the fuel is initiated by igniting with various compositions as are presently used for such purposes, such as a mixture of hydrazine, or unsymmetrical dimethyl hydrazine and nitric acid, or by triethyl aluminum and oxygen, or by a torch, or by an electrical ignition system. Supplemental, independent, fluid oxidizing materials that can be used include: liquid oxygen, or an efficient oxidizing compound, such as perchloryl fluoride, ($FClO_3$), fluorine, chlorine, highly concentrated hydrogen peroxide, fuming nitric acid, etc.

When a self-sustaining oxidizing agent is distributed throughout the fuel, the desirable amount can be determined by calculating the stoichiometric equivalent required for combustion of the fuel, and adjusting the calculation by subtracting where less than 100 percent efficiency is satisfactory, or adding, where desired, an excess to compensate for the lack of 100 percent efficiency in the actual combustion. Since the conditions of operation do not permit the time and type of mixing which give 100 percent efficiency, where other factors permit it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount, or even less than that amount of the oxidizing agent can be used, depending on the fuel efficiency desired.

The potassium and ammonium perchlorates and nitrates are particularly suitable for use in the practice of this invention.

The oxidizing agent, together with any modifier, can be introduced or suspended in the polymer in any convenient or appropriate manner. The mixture can be effected mechanically as on mixing mills, on a Banbury mixer, any single or double worm extruder, or by rotation of the mold when the material is being cast from a liquid state. When a solid is to be added, the thermoplastic material can desirably be softened by the addition of a softening agent, or, as indicated above, by the modifier itself. Such compounded mixtures can then be extruded, or otherwise shaped into the desired form, and then irradiated. However, whichever method of mixing is used, it is desirable to avoid the generation of heat that will raise the temperature to the ignition point of the oxidizing agent. Therefore, in some cases it is desirable to precool the materials to be mixed, or to provide means to withdraw the heat as it is generated.

Oxidizing agents which can be incorporated in accordance with safety conditions determined by their reactivity, are solid and liquid perchloryl aryl compounds of the formula $Ar—ClO_3$, such as perchloryl benzene, etc., ammonium persulfate, potassium permanganate, manganese dioxide, potassium iodate, potassium nitrate, potassium dischromate, chloric acid, perchloric acid, etc. Some of these are not self-sustaining oxidizing agents, and can be used when free oxygen, or compositions such as perchloryl fluoride, highly concentrated hydrogen peroxide, etc., which generate oxygen in situ, are used therewith. The liquid oxidizing agents can be incorporated with precautions to assure uniform distribution through the polymer mass, and to avoid ignition or explosive conditions during preparation and use of the fuel.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the treatment of polymeric materials as described herein is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of polymeric materials, and the shorter is the time of exposure required to accomplish the desired result. For other type of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graff generators, betatrons, synchrotrons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example Cobalt 60.

Various types of high power electron linear accelerators are commercially available, for example from Applied Radiation Corporation, Walnut Creek, California. In the following Example I, ARCO type travelling wave accelerator, model Mark I, operating at 3 to 10 million electron volts, was used to supply the irradiation. Other type of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined, according to "Reactor Shielding Design Manual" edited by Theodore Rockwell III and published by D. Van Nostrand Company, Inc., 1st edition, 1956, as that radiation dosage which produces energy absorption in human tissue equal to 93 ergs per gram of tissue.

In the practice of this invention, changes in properties of the materials can often be noted after treatment with even less than 1 megarep. However, it is generally advantageous to use doses of 2 megareps or more. The degree of change in properties is dependent somewhat on the dosage, greater changes being effected by increasing the dosage.

The material to be treated is often advantageously irradiated while in a container made of a material such as aluminum or glass which will not substantially interfere with the irradiation. It is advantageous also to use polymeric materials, such as polyethylene, nylons, i.e. 66 nylon, polycaprolactam, etc. It can also be wrapped in film or foil impervious to vapors and gases, such as aluminum foil, polyethylene film, etc., which will prevent substantially the escape of volatile materials. It is often advantageous to avoid oxidation or side reactions by the use of an inert atmosphere such as nitrogen. Moreover, it is advantageous to prevent the temperature from approaching that at which the material is unstable. This can be accomplished by cooling material before irradiation, for example with Dry Ice, or by dissipating the heat generated during irradiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight. Unless indicated otherwise, the terms "polymers" and "polymeric" are intended to include "copolymers" and "copolymeric." Molecular weights given herein are Staudinger molecular weights.

*Example I*

Polyethylene powder is mixed on a Banbury mixer with 25 percent of potassium perchlorate, based on the combined wieght of polymer and perchlorate. The resultant mixture is extruded into rods, one inch in diameter and three feet long. These are cooled to a temperature below 25° C., wrapped in polyethylene film, and irradiated with a dosage of 25 megareps, the temperature being checked periodically, and being allowed to cool whenever the temperature approaches 50° C. One of the irradiated bars is tested as a flare by igniting one end of the bar. The composition burns with a brilliant flame, which progresses gradually along the length of the bar.

*Example II*

The procedure of Example I is repeated, except that 10 percent of the divinyl ether bis-phenol (based on the combined weight of polymer and modifier) is added to the polyethylene prior to the addition of the oxidizing agent, and 40 percent of finely divided ammonium perchlorate is used instead of the potassium perchlorate. The irradiated product operates successfully as a flare, in accordance with the testing procedure of the preceding example.

*Example III*

The procedure of Example I is repeated, with similar success, using polystyrene instead of polyethylene.

Example IV

The procedure of Example III is repeated, using 10 percent divinyl benzene with the polystyrene, and using 50 percent potassium perchlorate. Excellent results are obtained.

Example V

The procedure of Example III is repeated, with similar success, using 20 percent perchloryl benzene instead of the ammonium perchlorate.

Example VI

The procedure of Example II is repeated twice, using in each case polypropylene instead of polyethylene, and in one case using 20 percent (based on combined weight of polymer and modifier) of a commercial divinyl benzene mixture containing 50 percent divinyl benzene and 50 percent ethyl styrene, in place of the divinyl ether bisphenol, and using 65 percent potassium perchlorate (based on combined weight of polymer, modifier, and perchlorate) instead of the ammonium perchlorate; in the other case, 20 percent (based on combined weight of polymer and modifier) of the allyl ester of 11-acryloxy-undecanoic acid is used instead of the divinyl ether of bis-phenol and 70 percent ammonium perchlorate (based on combined weight of polymer and modifier) is used. In each case, the product is irradiated with a dosage of 20 megareps, using Cobalt 60 as the irradiation source. In each case, the irradiated product is tested with excellent results by igniting one end and advancing it along its linear axis through the ignited zone by means of a device illustrated by FIG. 1 of copending application, Serial No. 730,714, which device is used without any stream of combustion-supporting gas.

Example VII

The preceding example is repeated, except that the mixture of polymer and oxidizing agent in each case is extruded into a ribbon, 1/16 inch thick and 1/4 inch wide. Excellent results are obtained when the irradiated product is tested as in Example VI.

Example VIII

A polyvinyl acetate film, five feet wide, is wound into a roll with a thin layer of finely divided ammonium powder spread evenly on the inner surface of the film as it is rolled, in such a manner that the powder is trapped between successive layers of the film as it is wound. The roll is pressed, as it is wound, in such a manner that the powder is imbedded in the polyvinyl acetate film. When the roll reaches a cross-sectional outside diameter of one inch, the accumulated weight of ammonium perchlorate represents 60 percent of the combined weight of film and powder. The cylinder is exposed to 30 megareps of irradiation, as in Example I, while maintaining the temperature below 50° C. After the irradiation, the roll is tested successfully as a flare in accordance with the procedure of Example I.

Example IX

The procedure of Example I is repeated, using the same dosages of irradiation, but using irradiation from different sources in each case, namely, X-ray, bombarded beryllium, and a Van de Graaff generator, respectively. In each case, the product is tested successfully in accordance with the procedure of Example I.

Example X

The procedure of Example VIII is repeated, except that potassium perchlorate is used instead of the ammonium nitrate, and a thin layer of 1,2-divinyloxy ethane, is spread on the film before the powdered oxidizing agent is added. The proportion of ingredients in the resultant roll is 40 parts of polyvinyl acetate, 10 parts of the divinyloxy ethane, and 50 parts of the perchlorate. Excellent results are obtained upon testing the irradiated product as a flare, in accordance with the procedure of Example I.

Example XI

The procedure of the preceding example is repeated, using in one case polyvinyl butyral film and divinyloxy benzene as the modifier, and in the other case using film of polyvinyl ethyl ether and the diacrylate of hexamethylene glycol as the modifier. In each case, the irradiated product is tested successfully in a combustion apparatus as illustrated in FIGURE 2 of copending application, Serial No. 730,714, used both with and without streams of air.

In addition to the polymeric hydrocarbons indicated above as preferred in the practice of this invention, various polymers, including copolymers, of polymerizable oxygenated hydrocarbons with each other or with a minor amount of other comonomers are also suitable for the practice of this invention. The oxygenated hydrocarbon polymers can be described as having an essentially hydrocarbon linear polymer chain with oxygen-containing groups branching off from the polymer chain. Such oxygenated hydrocarbon polymers include: polymeric ethers, polymeric esters, polymeric acetals, etc. Typical polymers are those derived from the following monomers: the acrylate esters, such as, for example, methyl acrylate, ethyl methacrylate, benzyl acrylate, butyl acrylate, methyl methacrylate, etc.; vinyl esters, such as vinyl acetate, vinyl benzoate, vinyl propionate, vinyl butyrate, etc.; allyl esters, such as allyl acetate, allyl propionate, allyl butyrate, methallyl acetate, methallyl propionate, methallyl benzoate, etc.; isopropenyl esters, such as isopropenyl acetate, isopropenyl benzoate, isopropenyl propionate, isopropenyl butyrate, etc.; various mixed esters of polybasic acids, such as, for example, allyl methyl phthalate, allyl methyl succinate, vinyl methyl succinate, vinyl ethyl phthalate, isopropenyl butyl succinate, allyl methyl oxalate, etc.; various esters of dibasic unsaturated acids, such as dimethyl maleate, diethyl maleate, dibutyl maleate, dimethyl fumarate, diethyl fumarate, dimethyl itaconate, diethyl itaconate, dibutyl itaconate, etc.; various unsaturated ethers, such as vinyl methyl ether, vinyl ethyl ether, vinyl butyl ether, allyl methyl ether, allyl ethyl ether, allyl amyl ether, isopropenyl methyl ether, isopropenyl ethyl ether, isopropenyl butyl ether, methallyl ethyl ether, methallyl butyl ether, etc.; and various others. Suitable polymeric materials also include polyvinyl acetals, such as polyvinyl acetal, polyvinyl propional, polyvinyl butyral, polyisopropenyl acetal, polyisopropenyl propional, polyallyl acetal, polymethallyl acetal, polyallyl propional, etc. Where the b.t.u. content of the fuel is an important consideration a high weight ratio of hydrocarbon to oxygen is desirable in the polymer.

Various crosslinking modifiers can be used in accordance with the practice of this invention, including compounds having one or more ethylenic or acetylenic groups therein. These serve to lower the energy level of irradiation required to produce the desired degree of crosslinking. The modifiers comprise organic compounds containing two unsaturated groups of the ethylenic or acetylenic type or derivatives thereof, which are connected through groups or linkages which are relatively stable to irradiation.

One type of preferred crosslinking modifier includes those having the formula:

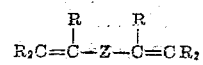

wherein Z is a divalent aromatic or aliphatic (including cycloaliphatic, unsaturated aliphatic, and heterocyclic groups containing in the ring structure, carbon, and a minor part of nitrogen and/or oxygen) groups and combinations thereof, in which groups there are at least two carbon atoms between said valencies; R is hydrogen, or an alkyl, aryl, chloro, fluoro, cyano, —COOR″, —CH₂COOR″, two R's can also represent a third bond between the two carbons, and R can also be joined with another R or Z to form a cycloaliphatic or heterocyclic ring containing a minor portion of nitrogen and/or oxygen, and R″ is hydrogen or a hydrocarbon group; preferably R is hydrogen, or two R's represent a third bond between the two carbons, or one R substituted with a lower alkyl group, such as methyl or ethyl. Z, K, and the R groups can have substituted thereon radicals which will not interfere with irradiation, such as hydrocarbon, chloro, fluoro, alkoxy, aryloxy, cycloalkoxy, alkaryloxy, aralkoxy, acyloxy, cyano, —COOR″, —CH₂COOR″, etc.

Typical compounds of the above formula include the following: dialkenyl aryl compounds, dialkenyl alkanes, dialkenyl cycloalkanes, dialkenyl derivatives of pyridine, piperidine, morpholine, furane, pyrimidine, piperazine, etc., alkenyl cycloalkenes, etc.

Another preferred type of modifier includes compounds having the formula A—Z—A′ wherein A and A′ can be identical or dissimilar groups selected from the formulas:

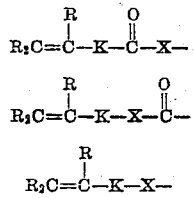

wherein K is any divalent aromatic or aliphatic group (including cycloaliphatic, unsaturated aliphatic, and heterocyclic groups containing in the ring structure, carbon, and a minor part of nitrogen and/or oxygen) and combinations thereof, and can also represent a single bond between the two adjacent atoms; X is oxygen or NR″; R″, Z and R are as defined above. Compounds of this formula include polyunsaturated polyesters, polyethers, ether-esters, polyamides, polyamines, amide-esters, amine-esters, ether-amides, ether-amines. Groups on Z, K, and R are as indicated above.

Other modifiers that can be used advantageously include those having the formulas:

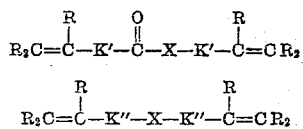

wherein R and X are as defined above, and K′ and K″ are the same as defined above for K, but the sum of carbon atoms between said valencies in the two K's is at least 2, and the sum of carbon atoms between said valencies in the two K″s is at least 3. Compounds fitting these formulas are polyunsaturated monoesters, monoethers, monoamides, and monoamines having 3 or more carbon atoms between the unsaturated groups.

Other modifiers, less desirable than those indicated above, can be used which have one of the following formulas:

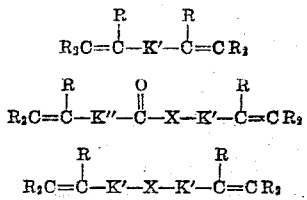

wherein R and X are as defined above; K′ is as defined above, except that when it is a divalent radical, then both valencies are attached to the same carbon atom; and K″ is a single bond, or, when K′ in the same compound is a single bond, then K″ can be a divalent radical having both valencies on the same carbon atom. Such compounds include butadiene-1,3 and its derivatives, pentadiene-1,4 and its derivatives, 1-vinyl-cyclohexene-1 and its derivatives, 1-vinyl-cyclohexene-2 and its derivatives, 4,4-divinyl piperidine, 1,1-divinyl-cyclohexane, furane, 3-allyl-furane, allyl acrylate, vinyl acrylate, isopropenyl methacrylate, isopropenyl chloracrylamide, vinyl methacrylamide, allyl acrylamide, vinyl acrylamide, vinyl crotonate, vinyl buten-3-oate, isopropenyl buten-3-oate, vinyl buten-3-amide, isopropenyl buten 3-amide, divinyl ether, diallyl ether, divinyl amine, diisopropenyl amine, vinyl allyl amine, diallyl amine, etc.

Polyalkenyl aryl compounds which can be used in the practice of this invention include; divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl benzene, diallyl naphthalene, triallyl naphthalene, diallyl diphenyl, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis-(alpha-ethyl-ethenyl)-naphthalene, bis-(alpha-ethyl-ethenyl)-diphenyl, bis-(alpha-vinyl-ethyl)-benzene, bis-(alpha-vinyl-ethyl)-naphthalene, bis-(alpha-vinyl-ethyl)-diphenyl, vinyl (alpha-vinyl-ethyl)-benzene, vinyl (alpha-vinyl-ethyl)-naphthalene, vinyl (alpha-vinyl-ethyl)-diphenyl, etc.

Other polyalkenyl aryl compounds that can be used include: dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5-isopropenyl-n-hexyl)-diphenyl, bis-(5-methyl-hepten-5-yl)-benzene, bis-(5-methyl-nonene-6-yl)-diphenyl, bis-(n-decen-5-yl)-toluene, di-cyclopentyl-naphthalene, divinyl carbazole, di-cyclohexenyl-benzene, etc.

Typical acetylenic hydrocarbons that can be used in the practice of this invention include: phenylene diacetylene, naphthaylene diacetylene, ethylene diacetylene, cyclohexylene diacetylene, n-hexene-5-yl-acetylene, etc.

Typical polyalkenyl aliphatic compounds that can be used in the practice of this invention include: diallyl, 1,6-heptadiene; 1,8-nonadiene; 2,8-decadiene; 2,9-dimethyl-2,8-decadiene, divinyl cyclohexane, divinyl cyclopentane, divinyl methyl cyclohexane, diallyl cyclohexane, diallyl cyclopentane, dibutenyl cyclohexane, dipentenyl cyclohexane; 1-vinyl-cyclohexene-3; 1-allyl-cyclohexene-2; 1-allyl-cyclohexene-3; diallyl cyclohexene, divinyl cyclohexene, divinyl piperidine, diallyl piperidine, diisopropenyl piperidine, divinyl pyridine, diallyl pyridine, diisopropenyl pyridine, dibutenyl pyridine; 3,5-divinyl morpholine; 2,5-divinyl piperazine; 1,4-divinyl piperazine, (beta-vinyl-alkyl)-furane, (beta-allyl-ethyl)-furane; 1,7-diphenyl-heptadiene-1,6; 2,7-diphenyl-octadiene-1,7, etc.

Various polyunsaturated polyesters suitable for the practice of this invention can be derived by forming the esters of acrylic acid and its various derivatives as indicated above with various polyhydroxy compounds of the formula:

$$HO—Z—OH$$

with Z as defined above. The various acrylic derivatives are the alpha-methyl (methacrylic), alpha-chloro (chloracrylic), beta-methyl (crotonic), alpha-chloro-beta-methyl and alpha,beta-dimethyl derivatives. Examples of various polyhydroxy compounds from which the polyesters can be prepared are: ethylene glycol, trimethylene glycol, tetramethylene glycol, 2,3-dihydroxybutane, 1,4 - dihydroxybutane, 1,4-dihydroxy-2-phenylbutane, 1-6-dihydroxy-hexane, 1,8-dihydroxy octane, 2,11-dihydroxy-dodecane, 2,11 - dimethyl - 2,11-dihydroxy-dodecane, resorcinol, hydroquinone, catechol, dihydroxy-naphthalene, trihydroxy benzene, trihydroxy naphthalene, dihydroxymethylnaphthalene, dihydroxy toluene, dimethylol benzene, di-(beta-ethylol) - benzene, di - (alpha-ethylol)-benzene, di-(beta-ethylol)-naphthalene, bisphenol or 2,2-di(p-phenylol)-propane, beta-ethylol-phenol, beta-ethylol-naphthol, omega-hydroxy-n-octyl-phenyl, n-octyl-resorcinol, alpha-methyl-heptyl-resorcinol, sec - butyl-rescorcinol, ethoxy-resorcinol, 1,8-dihydroxy-4-acetoxy-octane, phenoxy resorcinol, beta-phenylethoxy-hydroquinone, (ethylphenoxy)-catechol, acetoxy-dihydroxy naphthalene, 1,4-dihydroxy-cyclohexane, 1,4-dimethylol-cyclohexane, benzoxy-resorcinol, octoxy-bisphenol, 2,2-dimethyl-propanediol-1,3, 3-methyl-pentanediol-1,4, 2,2-diethylbutanediol-1,3, 4,5-dihydroxy-nonane, pentamethylene glycol, heptamethylene glycol, nonamethylene glycol, decamethylene glycol, glyceryl monoacetate, glyceryl monobenzoate, dihydroxy-vinyl-naphthalene, 2,11-dihydroxy-dodecene-5, 2,11 - dihydroxy-6-vinyl-dodecane, 2,34 - dihydroxy lycopene, dihydroxy-ethyl napthalene, dihydroxy-ethoxy-naphthalene, dihydroxy - diphenyl, dihydroxy-phenethoxy - diphenyl, (ethylphenyl) - hydroquinone, (ethyl-phenoxy)-resorcinol, 2-phenoxy-propane-1,3-diol, beta-ethylol-hydroxy-diphenyl, gamma-hydroxy-propyl-phenol, 2-hydroxy-8-phenlyol-nonane, 2,8-dihydroxy-4-phenyl-nonane, etc. Except for practical limitations of availability there would be no upper limit to the number of carbon atoms between the hydroxy groups, particularly when Z is aliphatic since irradiation can also cause crosslinking through that part of the molecule, especially when Z includes aliphatic unsaturation such as in derivatives formed from 2,11-dihydroxy-dodecene-6; 2,11-dihydroxy-6-vinyl dodecane, 2,34-dihydroxy-lycopene, vinyl-dihydroxy-naphthalene, etc.

Such polyunsaturated polyesters which can be used in the practice of this invention include the following as examples: ethylene glycol diacrylate and dimethacrylate, trimethylene glycol diacrylate, tetramethylene glycol dimethacrylate, pentamethylene glycol dicrotonate, hexamethylene glycol-di-(chloracrylate), diacrylate of 2,3-dihydroxybutane, dimethacrylate of 1,3-dihydroxy-butane, diacrylate of 1,6-dihydroxy-hexane (hexamethylene glycol), dimethacrylate of 1,8-dihydroxyoctane, di-chloracrylate of 2,11-dihydroxy-dodecane, dicrotonate of 2,11-dimethyl-2,11-dihydroxy-dodecane, diacrylate of deca-methylene glycol, diacrylate of glyceryl monoacetate, dimethacrylate of glyceryl monostearate, diacrylate of glycerine, diacrylate of dihydroxy-ethoxy naphthalene, diacrylate of (ethylphenyl)-hydroquinone, dimethacrylate of (ethylphenoxy)-resorcinol, diacrylate of di-(beta-ethylol)-benzene, diacrylate of omega-hydroxy-n-octyl-phenol, dicrotonate of dihydroxy-methylnaphthalene, di(chloracrylate) of dihydroxy-diphenyl, the acrylate-methacrylate mixed ester of dihydroxy-diphenyl, the crotonate-chloro-acrylate mixed ester of resorcinol, etc.

Polyunsaturated polyesters suitable for the practice of this invention can also be derived by forming the esters of unsaturated alcohols such as vinyl, isopropenyl, alpha-chloro-vinyl, allyl, methallyl, alpha-phenethylallyl, beta-chlorallyl, alpha-phenyl-allyl alcohols, 2-hydroxyl-1,4-butadiene, 7-hydroxy-octene-1, 7-hydroxy-2-methyl-octene-1, 2-hydroxy-2-methyl-octadiene-4,7, 3-hydroxy-3-methyl - butene-1, penten-1-ol-5, 2,5-dimethyl-5-hydroxy-hexene-1, 17-hydroxy-octadecene-1; 5-acetoxy-7-hydroxy-octene-1; 5-phenoxy-7-hydroxy-octene-1, etc. with polycarboxylic acids of the formula

HOOC—Z—COOH with Z defined as above.

Various polycarboxylic acids from which the polyunsaturated polyesters can be prepared include: phthalic, isophthalic, trimellitic, terephthalic, acetoxy-phthalic, phenoxy - phthalic, 3-vinyl - phthalic, 3-allyl-phthalic, phenethoxy terephthalic, naphthalene dicarboxylic, diphenyl dicarboxylic, butyroxy - naphthalene dicarboxylic, octyl - naphthalene dicarboxylic, nonyl - diphenyl dicarboxylic, sebacic, acetoxy-sebacic, azelaic, butoxy-azelaic, adipic, itaconic, glutaconic, decapentaene-10-dicarboxylic, pimelic, ethyl-phenyl-glutaric, benzoxy-glutaric, glutaric, octyl-succinic, phenyladipic, japanic (nonadecene-1,19-dicarboxylic acid), thapsic, malonic, methly-succinic, hydroxy-succinic, brassilic, suberic acids, etc., and also including the condensation products of maleic anhydride with $C_{22}$ and similar olefins, and their hydrogenation products.

Typical polyunsaturated polyesters which can be used in the practice of this invention include the following: divinyl phthalate, diallyl phthalate, diallyl-acetoxy-phthalate, diisopropenyl phthalate, dimethallyl phthalate, diallyl butoxy phthalate, di-(alpha-chloro-vinyl) phthalate, di-(1-methyl-5-vinyl-pentyl)phthalate, diallyl terephthalate, divinyl terephthalate, triallyl-trimellitate, diisopropenyl naphthalene dicarboxylate, dimethallyl-diphenyl dicarboxylate, di(alpha-chloro-vinyl) octyl-naphthalene dicarboxylate, diallyl succinate, divinyl succinate, diisopropenyl succinate, divinyl adipate, diallyl phenyl adipate, diisopropenyl butoxy-azelate, di(beta-chlorallyl)-acetoxyphthalate, dimethallyl phenoxy-naphthalene dicarboxylate, etc.

Polyunsaturated polyethers suitable for the practice of this invention can be derived by forming the ethers of unsaturated alcohols such as vinyl, isopropenyl, alpha-chloro-vinyl, allyl, methallyl, alpha-phenethyl-allyl, beta-chlorallyl, alpha pheny-allyl alcohols, 7-hydroxy-octene-1, 7-hydroxy-2-methyl-octene-1, 3 - hydroxy - 3 - methyl-butene-1, penten-1-ol-5, 2,5-dimethyl-5-hydroxy-hexene-1, 17- hydroxy-octadecene-1, 5-acetoxy-7-hydroxy-octene-1, 5-phenoxy-7-hydroxy-octene-1, etc., with polyhydric compounds of the formula HO—Z—OH, with Z defined as above.

Examples of various polyhydric compounds from which the polyethers can be prepared are ethylene glycol, trimethylene glycol, 2,3-dihydroxybutane, 1,4-dihydroxybutane, 1,3-dihydroxy-2-phenyl-butane, 1,6-dihydroxyhexane, 1,8-dihydroxy-octane, 2,11-dihydroxy-dodecane, 2,11-dimethyl - 2,11-dihydroxy-dodecane, 2,2-dimethyl - propanediol - 1,3, 3 - methylpentanediol - 1,4, 2,2 - diethyl-butanediol-1,4, 4,5-dihydroxy-nonane, pentamethylene glycol, heptamethylene glycol, nona-methylene glycol, decamethylene glycol, glyceryl mono-acetate, glyceryl monobenzoate, resorcinol, hydroquinone, catechol, dihydroxymethylnaphthalene, dihydroxy-vinyl-naphthalene, 2,11 - dihydroxy - dodecane - 6, 2,11 - dihydroxy-6-vinyl-dodecane, 2,34 - dihydroxy lycopene, dihydroxy-ethyl naphthalene, dihydroxy-ethoxy-naphthalene, dihydroxy - diphenyl, dihydroxy - phenethoxy-diphenyl, (ethylphenyl)-hydroquinone, (ethylphenoxy)-resorcinol, 2-phenoxy-propane-1,3-diol, beta-ethylol-hydroxy-diphenyl, gamma-hydroxy-propyl-phenol, 2 - hydroxy - 8 - phenylol-nonane, 2,8 - dihydroxy - 4-phenyl-nonane, dihydroxy-toluene, dimethylol benzene, di-(beta-ethylol)-benzene, di-(alpha-ethyiol)-benzene, di-(beta-ethylol) - naphthalene, bisphenol or 2,2-di-(p-phenylol)-propane, beta - ethylol-phenol, beta - ethylol-naphthol, omega-hydroxy-n-octyl-phenol, n-octyl-resorcinol, alpha-methyl-heptyl-resorcinol, sec-butyl resorcinol, ethoxy-resorcinol, 1,8-dihydroxy-4-acetoxy-octane, phenoxy resorcinol, beta-phenylethoxy-hydroquinone, (ethylphenoxy)-catechol, acetoxy-dihydroxy naphthalene, benzoxy resorcinol, octoxy-bisphenol, etc. Except for practical imitations of availability, there is no upper limit to the number of carbon atoms between the hydroxy groups, particularly when Z is aliphatic since irradiation can cause crosslinking through that part of the molecule.

Polyunsaturated polyethers which can be used in the practice of this invention include the following as examples: the divinyl diethers of ethylene glycol, trimethylene glycol, pentamethylene glycol, hexamethylene glycol, 2,3-dihydroxybutane, 1,4-hydroxybutane, 1,4-dihydroxy-phenyl-butane, resorcinol, di(beta-ethylol)-benzene, etc., various diallyl diethers, such as the diallyl diether of ethylene glycol, trimethylene glycol, tetramethylene glycol, 2,3-dihydroxy-butane, resorcinol, beta-ethylol phenol, bisphenol, etc.; the diisopropenyl diethers of the aforementioned polyhydric compounds, such as the diisopropenyl diether of ethylene glycol, trimethylene glycol, tetramethylene glycol, 1,6-dihydroxy hexane, trihydroxy benzene, trimethylol benzene, etc.; dimethallyl diethers of ethylene glycol, trimethylene glycol, pentamethylene glycol, resorcinol, etc.; diethers of 2-methylol-butadiene-1,4, and of 2-hydroxy-2-methyl-octadiene-4,7 with dihydroxy naphthalene, dihydroxy toluene, beta-ethylol-phenol, ethoxy resorcinol, etc.; the di-(alpha-chloro-vinyl) diether of 1,8-dihydroxy-octane, the ethylene glycol diether of 7-hydroxy-2-methyl-octene-1, the diether of beta-ethylol-phenol and 3-hydroxy-3-methyl-butene-1, the ethylene glycol diether of 17-hydroxy-octodecene-1, the decamethylene glycol diether of pentene-1-ol-5, the diether of gamma-hydroxy-propyl-phenol and 5-phenoxy-7-hydroxy-octene-1, the diether of alpha-phenethyl-allyl-alcohol and beta-ethylol-hydroxy-diphenyl, the diether of dihydroxy-phenoxy-naphthalene and 5-phenoxy-7-hydroxy-octene-1, etc., as well as corresponding triethers such as trivinyl, triisopropenyl, triallyl triethers of 2,5,7-trihydroxy-n-octane, trihydroxy-benzene, trimethylol benzene, trihydroxy naphthalene, etc., divinyl diethers of benzoxy-r e s o r c i n o l, phenethyl-resorcinol, acetoxy-resorcinol, propyl-resorcinol, propoxy-resorcinol, etc., diallyl diethers of 1,3-dihydroxy-3-phenylbutane, 5-ethoxy-2,7-dihydroxy-n-octane, (beta-hydroxy-ethyl)-phenyl, phenol, etc.

Examples of other polyunsaturated polyesters that can be used include: tetramethylene bis-hexen-5-oate, trimethylene bis-octen-4-oate, hexamethylene bis-hepten-4-oate, tetramethylene glycol diester of the monomethyl ester of maleic acid, the ethylene glycol diester of the monoethyl ester of itaconic acid, the tetramethylene glycol diester of beta-cyanoacrylic acid, the hexamethylene glycol diester of cyclohexene-3-formic acid, the tetramethylene glycol diester of cyclopentene-3-formic acid, octen-4-yl 5-crotonoxy-caproate, decen-6-yl 11-(beta-cyano-acryloxy)-octadecanoate, hexen-3-yl 8-(p-butenyl-benzoxy)-octanoate, diallyl cyclohexylene diacetate, dibutenyl cyclohexylene-diformate, etc.

Examples of other polyunsaturated polyethers that can be used include: the ethylene glycol diether of 17-hydroxy-octadecene-8, the hexamethylene glycol diether of penten-3-ol-1, the hexamethylene glycol diether of 7-hydroxy-octene-4, the tetramethylene glycol diether of cyclohexen-3-ol, the ethylene glycol diether of cyclohexene-3-ethylol, the cyclohexene glycol diether of hexene-3-ol-1, bis(beta-n-octyloxy-ethyl)-cyclohexane, etc.

Various polyunsaturated polyamides suitable for the practice of this invention can be derived by forming the amides of acrylic acid and its various derivatives with various polyamino compounds of the formula:

RHN—Z—NHR with Z and R as defined above.

Typical polyunsaturated polyamides that can be used in the practice of this invention include the following as examples: ethylene diacrylamide and dimethacrylamide, trimethylene diacrylamide, tetramethylene dimethacrylamide, pentamethylene dicrotonamide, hexamethylene di-(chloracrylamide), diacrylamide of 2,3-diaminobutane, dimethacrylamide of 1,3-diaminobutane, diacrylamide of 1,6-diaminohexane, dimethacrylamide of 1,8-diamino octane, di-chloroacrylamide of 2,11-diamino dodecane, dicrotonamide of 2,11-dimethyl-2,11-diamino dodecane, diacrylamide of decamethylene diamine, dimethacrylamide of (phenyl diamine), diacrylamide of di-(beta-amino-ethyl)-benzene, dicrotonamide of diamino methyl naphthalene, di(chloracrylamide) of diaminodiphenyl, the acrylamide-methacrylamide mixed amide of diamino diphenyl, the crotonamide-acrylamide mixed amide of phenylene diamine, the ethylene diamide of hexen-3-oic acid, the tetraethylene diamide of octen-5-oic acid, the trimethylene diamide of the monomethyl amide maleic acid, the hexamethylene diamide of the monoethyl ester of itaconic acid, the hexamethylene diamide of beta-cyano-acrylic acid, etc.

Polyunsaturated polyamides suitable for the practice of this invention can also be derived by forming the amides of unsaturated amines with polycarboxylic acid of the formula HOOC—Z—COOH with Z defined as above. Typical suitable carboxylic acids of this formula are listed above for use in the preparation of polyesters.

Typical polyunsaturated polyamides of this type include the following: N,N'-divinyl phthalic diamide, N,N'-diallyl phthalic diamide, N,N'-diisopropenyl phthalic diamide, N,N'-dimethallyl phthalic diamide, N,N'-diallyl acetoxy-phthalic diamide, N,N'-di-(1-methyl-5-vinyl-pentyl) phthalic diamide, N,N'-diallyl terephthalic diamide, N,N'-divinyl terephthalic diamide, N,N',N''-triallylmellitic triamide, N,N-diisopropenyl naphthalene dicarboxylamide, N,N' - methallyl - diphenyl-dicarboxylamide, N,N'-diallyl succinic diamide, N,N'-divinyl succinic diamide, N,N'-diisopropenyl succinic diamide, N,N'-divinyl adipic diamide, N,N'-diallyl phenyl adipic diamide, N,N'-diisopropenyl butoxy-azelaic diamide, N,N'-di(beta-chlorallyl)-phthalic diamide, N,N'-di-hexen-3-yl itaconic diamide, N,N'-di-octen-5-maleic diamide, N,N'-dicrotyl azelaic diamide, N,N'-dicrotyl naphthalene dicarboxylamide, N,N'-dioctenyl adipic diamide, N,N'-di-propargyl azelaic diamide, N,N'-dipropargyl phthalic diamide, N-allyl 5-acrylamido-caproamide, N-butenyl 11-methacrylamido-undecanamide, N-hexen-3-yl 9-hexenoxy-nonamide, etc.

Typical polyunsaturated polyamines that can be used in the practice of this invention include the following as examples: 1,4-bis(vinylamino)-butane, hexamethylene bis (vinylamine), 1,8-bis-(allylamine)-octane, 1,9-di-(isopropenylamino)-decane, bis(vinylamino)-benzene, bis-(allylamino)-diphenyl, bis(isopropenylamino) - naphthalene, bis-(N-methyl-isopropenylamino)-benzene, 1,4-bis-(beta-cyclohexene-3-ethyl-amino)-butane, 1,6-bis-(n-hexen-3-yl-amino)-hexene, etc.

Typical polyunsaturated ester-amides, ether-amides, ester-amines, amino-amides, and ether-amines that can be used in the practice of this invention include as typical examples: pentamethylene monoacrylate monoacrylamide, hexamethylene monomethacrylate monomethacrylamide, trimethylene monoacrylate monomethacrylamide, (para-acryloxy-phenyl) acrylamide, the dimethylamide of the mono-hexan-4-yl ester of itaconic acid, etc., the N-vinyl amide of the monovinyl ester of phthalic acid, the monoallyl amide-monoallyl ester of succinic acid, the hexen-4-yl monoester allyl monoamide of azelaic acid, the allyl ester of 5-acrylamido caproic acid, the isopropenyl ester of 14-methacrylamido undecanoic acid, cyclohexen-3-yl ester of 5-betacyanoacrylamido-caproic acid, the vinyl ether of ethylene monoacrylamide, the allyl ether of trimethylene monomethacrylamide, the methallyl ether of tetramethylene monochloracrylamide, the chlorallyl ether of pentamethylene monocrotonamide, the alpha-phenyl-allyl ether of monoacrylamide of 2,11-dimethyl-2-hydroxy-11-amino-dodecane, N-allyl 5-allyloxy caproamide, N-isopropenyl 11-(hexen-4-oxy)-octadecanamide, N-vinyl(p-vinylphenoxy)-benzamide, 4- vinyl(4-allyloxy-cyclohexyl)-formamide, 1-acryloxy-9-allylamino-nonane, p-(hexen-3-yl-amine)-phenyl methacrylate, (4-allylamino-cyclohexyl), crotonate, methallyl 11-methallylamino-undecanoate, isopropenyl 5-isopropenylamino-caproate, vinyl 9-(hexane-3-yl-amino)nonate, N-(4-allylamino-butyl)acrylamide, N-(6-isopropenylamino-hexyl) methacrylamide, N-(p-butenylamino-phenyl) crotonamide, N-(4-vinylamino-cyclohexyl) hexen-4-amide, N-allyl 5-allylamino-caproamide, N-cyclohexenyl 11-cyclohexenylamino-undecanamide, 1-vinyloxy-9-vinylamino-nonane, 2-allyloxy-10-allylamino-undecane, 1-hexenyloxy-4-hexenylamino-cyclohexane, etc.

Typical polyunsaturated monoamides and monoamines of the above formulas, suitable for the practice of this invention, include N-(p-vinyl-phenyl)acrylamide,
N-(o-vinyl-phenyl)methacrylamide,
N-(m-vinyl-phenyl)chloracrylamide,
N-(p-vinyl-phenyl)crotonate,
N-(p-isopropenyl-phenyl)acrylamide,
N-(o-isopropenyl-phenyl)-methacrylamide,
N-(m-isopropenyl-phenyl)chloracrylamide,
N-(p-isopropenyl-phenyl)crotonamide,
N-(p-allyl-phenyl)acrylamide,
N-(p-allyl-phenyl)crotonamide,
N-allyl para-(4-vinyl-1-methyl-n-butyl)-phenyl acrylamide,
N-allyl para-(4-vinyl-1-methyl-n-butyl)-benzamide,
N-(n-hexene-3-yl)-hexene-3-amide,
para-isopropenyl-para'-(isopropenyl-amino)-diphenyl,
the allyl amine of para-(6-isopropenyl-1-methyl-n-hexyl)-diphenyl,
1-(allyl-amino)-7-isopropenyl-heptane,
1-(isopropenyl-amino)-6-isopropenyl-hexane,
1-(vinyl-amino)-8-vinyl octane,
bis-(4-vinyl-cyclohexyl)-amine,
bis-(4-isopropenyl-cyclohexyl)-amine,
N-(n-hexene-3-yl)-4-allyl-cyclohexyl-formamide,
4-allyl-cyclohexyl-crotonamide,
diallyl-amine,
dimethallyl-amine,
di-hexene-3-yl-amine, etc.

Other examples of polyunsaturated modifiers of the above formula can be used in the practice of this invention include:

the vinyl ether of ethylene glycol monoacrylate;
the allyl ether of trimethylene glycol monomethacrylate;
the methallyl ether of tetramethylene glycol monochloracrylate;
the chlorallyl ether of pentamethylene glycol monocrotonate;
the mono-(beta-methyl-chloracrylate) of the isopropenyl ether of 1,4-dihydroxy-2-phenyl-butane;
the alpha-phenyl-allyl ether of the monoacrylate of 2,11-dimethyl-2,11-dihydroxy-dodecane;
the monoacrylate monocrotonate of the glyceryl monoether of 7-hydroxy-octene-1;
the isopropenyl-ether of the monoacrylate of 2,11-dihydroxy-dodecene-6;
the monoether of 2-methylol-1,4-butadiene and the monomethacrylate of 2,11-dihydroxy-6-vinyl-dodecane;
the monoether of 2-hydroxy-2-methyl-octadiene-4,7 and the monoacrylate of 2,34-dihydroxy-2,3,34,35-tetrahydrolycopene;
the isopropenyl ether of the monochloracrylate of hexamethylene glycol;
the mono-(alpha,beta-dimethylacrylate) of the 7-hydroxy-octene-1 ether of 1,8-dihydroxy-octane;
the monoacrylate of the 3-hydroxy-3-methyl-butene-1 ether of resorcinol;
the monomethacrylate of the ether of pentene-1-ol-5 and dihydroxynaphthalene;
the monomethacrylate of the ether of 2,5-dimethyl-5-hydroxy-hexene-1 and dihydroxy-methyl-diphenyl;
the monoacrylate of the ether of 17-hydroxy-octadecene-1 and dihydroxy-acetoxy-naphthalene;
the monocrotonate of the ether of 5-acetoxy-7-hydroxy-octene-1 and di-(beta-ethylol)-benzene;
the monoacrylate of the ether of 5-phenoxy-7-hydroxy-octene-1 and benzoxy resorcinol;
the monoacrylate of the vinyl ether of beta-ethylol phenol;
the monomethacrylate of the allyl ether of ethoxy resorcinol;
the monoacrylate of the isopropenyl ether of phenoxy-hydroquinone;
the monoacrylate of the isopropenyl ether of beta-phenyl-ethoxy-hydroquinone;
the monomethacrylate of the isopropenyl ether of 1,8-dihydroxy-4-acetoxy-dodecane;
the monoacrylate of the vinyl ether of (ethylphenoxy)-dihydroxy-naphthalene;
the monoacrylate of the diisopropenyl ether of trihydroxy-naphthalene;
the monoacrylate, monochloracrylate of the allylether of 2,5,7-trihydroxy-octane, etc.

Such modifiers also include:

vinyl beta-acryloxy-butyrate;
methallyl epsilon-methacryloxy-caproate;
isopropenyl omega-chloracryloxy-dodecanoate;
vinyl beta-acryloxy-propionate;
allyl 11-crotonoxy-hexadecanoate;
a-phenyl-allyl omega-acryloxy decanoate;
(1-methyl-5-vinyl-n-pentyl) p-acryloxy-benzoate;
(alpha,alpha-dimethyl-allyl)(beta-methyl-chloracryloxy)-ethoxy-benzoate;
(3-vinyl-n-propyl) p-acryloxyphenyl-acetate;
(1,1-dimethyl-3-isopropenyl-propyl) acryloxy-methoxy-benzoate;
(1-methyl-15-vinyl-n-pentadecyl) 2-acryloxy-2-phenyl-propionate;
(1-methyl-3-acetoxy-5-vinyl-n-pentyl)(alpha,beta-dimethyl-acryloxy)-naphthoate;
(1-methyl-3-phenoxy-5-vinyl-n-pentyl)(acryloxy-methoxy)-naphthoate;
isopropenyl 12-acryloxy-octaden-9-oate;
allyl-16-methacryloxy-hexadecen-7-oate;
2-methyl-octadiene-4,7-yl-2-chloracryloxy-(acetoxy-naphthoate);
methallyl-5-methacryloxy-8-benzoxy-nonoate;
chlorallyl crotonoxy-ethyl-naphthoate;
allyl methacryloxy-octoxy-benzoate;
a-phenyl-allyl-5-crotonoxy-nonoate;
vinyl-bis-(acryloxy-phenyl)-benzoate;
chlorallyl (acryloxy-phenoxy-ethyl)-benzoate;
vinyl-3-acryloxy-5-chloracryloxy-palmitate;
vinyl beta-vinyloxy propionate;
vinyl beta-allyloxy propionate;
vinyl beta-methallyloxy-butyroate;
allylepsilon-allyloxy-caproate;
chlorallyl omega-isopropenyloxy-n-hexadecanoate;
alpha-phenyl-allyl 11-(1-methyl-5-vinyl-n-pentyloxy)n-hexadecanoate;
1-methyl-5-vinyl-pentyl omega-(1-methyl-5-vinyl-n-pentyloxy)n-decanoate;
alpha,alpha-dimethyl allyl (alpha-phenyl-allyloxy)-benzoate;
3-vinyl-n-propyl (3-vinyl-n-propyloxy-beta-ethoxy)-benzoate;
vinyl (1,3-dimethyl-3-isopropenyl-n-propoxy-phenyl)-acetate;
1-methyl-15-vinyl-n-pentadecyl alpha-phenyl-beta-(1-methyl-3-acetoxy-5-vinyl-pentyloxy)-propionate;
isopropenyl (1-methyl-3-phenoxy-5-vinyl-pentyloxy)-naphthoate;
(1-methyl-n-heptadecyl)(vinyloxy-methyl)-naphthoate;

isopropenyl acetoxy-(1-methyl-5-vinyl-pentyloxy)-naphthoate;
(3 - vinyl - n - propyl)ethyl - (1,2 - dimethyl - allyloxy)-naphthoate;
methallyl octoxy-(allyloxy)-benzoate;
alpha-phenyl-allyl-5-vinyloxy-8-benzoxy-n-nonoate;
methallyl bis(vinyloxyphenyl)-benzoate;
vinyl ethyl-(vinyloxyphenyl)-benzoate;
vinyl 3,5-diallyloxy-palmitate;
vinyl beta,beta-bis-acryloxy-propionate;
divinyl acryloxy-succinate;
1-methyl-4,6-diallyloxy-heptyl acrylate;
vinyl bis-(isopropenyl-oxy-phenyl)-benzoate;
diallyl (beta-allyloxy-ethyl)-terephthalate, etc.

Other suitable polyunsaturated modifiers include:

vinyl-phenyl acrylate,
vinyl-phenyl methacrylate,
vinyl-phenyl chloracrylate,
vinyl-phenyl crotonate,
isopropenyl-phenyl acrylate,
isopropenyl-phenyl methacrylate,
isopropenyl-phenyl chloracrylate,
isopropenyl-phenyl crotonate,
allyl-phenyl acrylate,
allyl-phenyl methacrylate,
allyl-phenyl-chloracrylate,
allyl-phenyl crotonate,
allyl para-(4-vinyl-1-methyl-n-butyl)-phenyl acrylate,
allyl para-(4-vinyl-1-methyl-n-butyl)-benzoate,
the allyl ether of para-(6-isopropenyl-1-methyl-n-hexyl)-phenol 2-vinyl-5-acryloxy-naphthalene,
2-isopropenyl-5-acryloxy-naphthalene,
1 vinyl-5-methacryloxy-naphthalene,
2-isopropenyl-5-chloracryloxy-naphthalene,
2-allyl-5-methacryloxy-naphthalene,
1-acryloxy-6-(4-vinyl-1-methyl-n-butyl)-naphthalene,
para-vinyl-para'-acryloxy-diphenyl,
para-isopropenyl-para'-methacryloxy-diphenyl,
para-allyl-para'-chloracryloxy-diphenyl,
the allyl ester of 5-(4-vinyl-1-methyl-n-butyl)-naphthoic acid,
the allyl ether of para-(6-isopropenyl-1-methyl-n-hexyl)-diphenyl-carboxylic acid,
6-isopropenyl-1-methyl-hexacrylate,
8-vinyl-1-methyl-n-octylmethacrylate,
the isopropenyl ester of 6-vinyl-heptanoic acid,
the methallyl ester of 6-vinyl-octanoic acid,
the vinyl ester of 7-vinyl nonanoic acid,
the allyl ether of 7-isopropenyl-heptanol-1,
the isopropenyl ether of 6-isopropenyl-hexanol-1,
the vinyl ether of 8-vinyl-octanol-1,
1,8-diisopropenyl-n-octane,
1,6-diisopropenyl-n-hexane, etc.

The amount of polyunsaturated modifier to be added will vary depending on the properties of the base material to which it is added. For example, high molecular weight base materials would require less modifier to bring them to an infusible state, whereas a base material of lower molecular weight would require larger amounts of polyunsaturated modifier. Although even as little as 0.1 percent of polyunsaturated compounds often effects notable changes in the properties of the base material, it is generally advantageous to have at least 1 percent or more of such modifier present. The upper limit in the amount of such modifiers is determined by various factors, such as the effect on the B.t.u. value of the resultant product, etc. While even higher percentages of modifier, based on weight of the base material, might be desired in some cases where a softening effect is desired and where the effect on the B.t.u. value is not adverse or is permissible, as much as 50 percent, based on weight of base material, can be present. However, for practical and economical reasons, it is generally advantageous to add only sufficient modifier to effect infusibility in the base material or to effect such softening as may be desired.

While the desired amount of irradiation is not much more than the amount required to produce crosslinking or infusibility in the material being exposed, it is obviously desirable to avoid exposures of such great amount as to cause degradation or decomposition to such a degree that the product cannot be used for the purposes of this invention. While the upper limit will vary according to the material being treated, many of the base materials can safely be exposed to 100 megareps or more, while exposure of more sensitive materials should be below 80 megareps.

Other shapes and other uses of the fuel than those indicated above are contemplated. For example, solid rods or solid cylinders can be used with combustion being conducted on the outer surfaces. Particularly with the amount of oxidizing agent permitting more easily controlled combustion, the fuel can be used in jet planes and for many other purposes.

While certain features of this invention have been described in detail with respect to various embodiments thereof, it will, of course, be apparent that other modifications can be made within the spirit and scope of this invention and it is not intended to limit the invention to the exact details shown above, except insofar as they are defined in the following claims.

The invention claimed is:

1. A process of combustion comprising the step of feeding in a continuous manner into an ignited zone, an elongated shape of an irradiated polymer mixture which consists essentially of an addition polymer of a compound having a polymerizable ethylenic group therein and selected from the class consisting of hydrocarbon and hydrocarbon derivatives having only derivative groups therein selected from the class consisting of ether and ester groups, and about 5–80 percent by weight of a combustion-supporting material selected from the class consisting of potassium perchlorate, ammonium perchlorate, ammonium nitrate, ammonium persulfate, potassium permanganate, manganese dioxide, potassium iodate, potassium nitrate, potassium dichromate, chloric acid, perchloric acid, and aryl perchloryl compounds, said polymer mixture having received an irradiation dosage of at least about two megareps of ionizing radiation derived from an energy source of at least 100,000 electron volts.

2. A process of claim 1, in which said irradiated polymer is a polymeric olefin.

3. A process of claim 1, in which said irradiated polymer is polyethylene.

4. A process of claim 1, in which said irradiated polymer is polypropylene.

5. A process of claim 1, in which said irradiated polymer is a polymeric alkenyl aryl compound.

6. A process of claim 1, in which said irradiated polymer is a polymeric vinyl aryl hydrocarbon.

7. A process of claim 1, in which said irradiated polymer is a polymeric styrene.

8. A process of claim 1, in which said irradiated polymer is a polymeric vinyl aryl compound having an alkyl substituent on the aryl nucleus.

9. A process of claim 1, in which said polymer contains at least 0.1 percent by weight of a polyunsaturated modifier therein at the time of irradiation, said modifier having a plurality of unsaturated groups therein selected from the class consisting of ethylenic and acetylenic groups, and said modifier containing no substituent radicals therein other than selected from the group consisting of hydrocarbon, ether, ester, amino, amido, hydroxy, and chloro radicals.

10. A process of claim 1, in which said polymer contains a polyalkenyl aryl hydrocarbon at the time of irradiation.

11. A process of claim 10, in which said polyalkenyl aryl hydrocarbon is a divinyl benzene.

12. A process of claim 1, in which said oxidizing agent is potassium perchlorate.

13. A process of claim 1, in which said oxidizing agent is ammonium perchlorate.

14. A process of claim 1, in which said oxidizing agent is perchloryl benzene.

15. A process of claim 1, in which said polymer comprises a polymeric olefin and said oxidizing agent comprises potassium perchlorate.

16. A process of claim 1, in which said polymer comprises a polymeric ethylene and said oxidizing agent comprises potassium perchlorate.

17. A process of claim 1, in which said polymer comprises a polymeric ethylene and perchloryl benzene.

18. A process of claim 1, in which said polymer comprises a polymeric styrene and said oxidizing agent comprises potassium perchlorate.

19. A process of claim 1, in which said polymer contained before irradiation at least 0.1 percent by weight of a polyunsaturated modifier, said modifier having a plurality of unsaturated groups therein selected from the class consisting of ethylenic and acetylenic groups, and said modifier containing no substituent radicals therein other than selected from the group consisting of hydrocarbon, ether, ester, amino, amido, hydroxy, and chloro radicals.

20. A process of maintaining the combustion of a solid fuel in elongated shape, comprising the step of advancing an ignited zone along the length of said elongated shaped fuel consisting essentially of an irradiated polymer mixture which consists essentially of an addition polymer of a compound having a polymerizable ethylenic group therein, and selected from the class consisting of hydrocarbon and hydrocarbon derivatives having only derivative groups therein selected from the class consisting of ether and ester groups, and about 5–80 percent of a combustion-supporting material selected from the class consisting of potassium perchlorate, ammonium perchlorate, ammonium nitrate, ammonium persulfate, potassium permanganate, manganese dioxide, potassium iodate, potassium nitrate, potassium dichromate, chloric acid, perchloric acid, and aryl perchloryl compounds, said polymer mixture having received an irradiation dosage of at least about two megareps of ionizing radiation derived from an energy source of at least 100,000 electron volts.

References Cited in the file of this patent

UNITED STATES PATENTS

| | | |
|---|---|---|
| 2,622,277 | Bonell et al. | Dec. 23, 1952 |
| 2,791,883 | Moore et al. | May 14, 1957 |

FOREIGN PATENTS

| | | |
|---|---|---|
| 582,621 | Great Britain | Nov. 22, 1946 |

OTHER REFERENCES

Deschere: Ind. Eng. Chem., vol. 49, No. 9, September 1957, pp. 1333–6.

"Polythene," edited by Renfrew and Morgan, Iliffe and Sons, London, 1957, pp. 247–64.